Sept. 13, 1960 M. A. KIEL, SR 2,952,469
CORN SALVAGE PICKER AND TRAILER
Filed March 5, 1957 4 Sheets-Sheet 2

INVENTOR.
MERWIN A. KIEL, SR.
BY
ATTORNEY

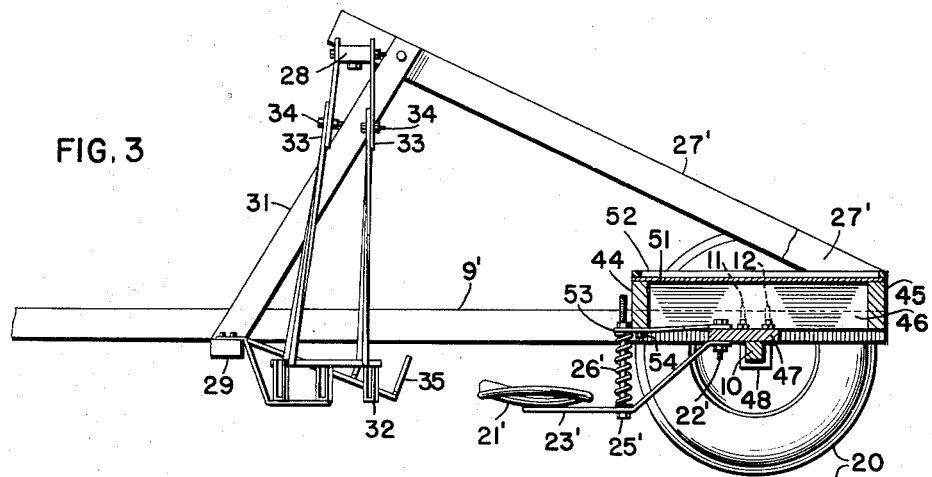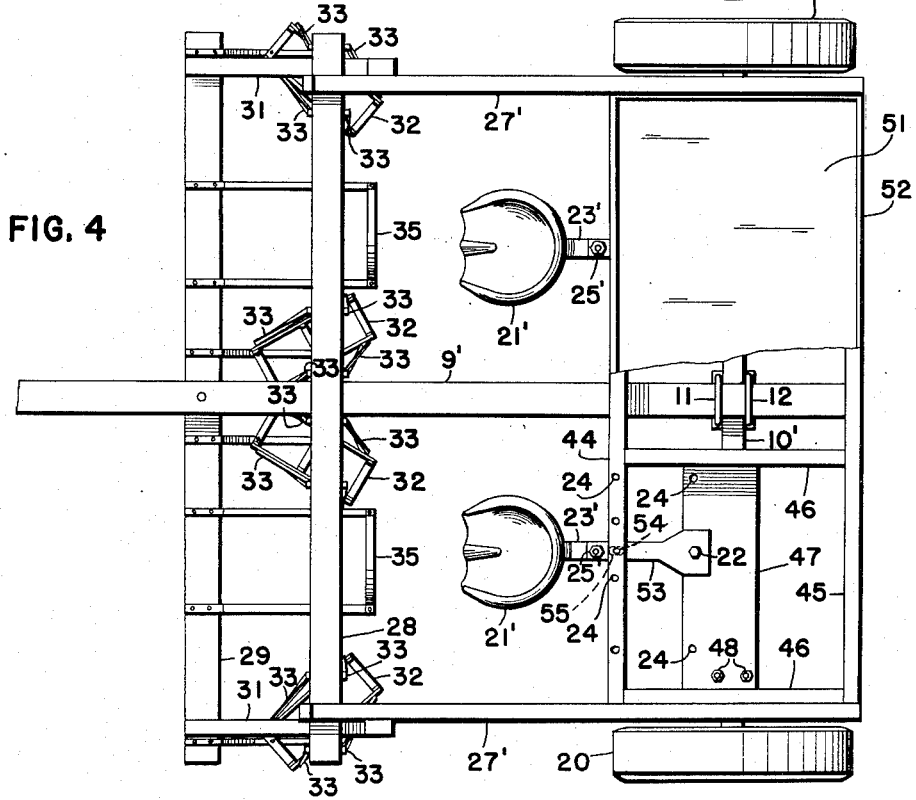

United States Patent Office 2,952,469
Patented Sept. 13, 1960

2,952,469

CORN SALVAGE PICKER AND TRAILER

Merwin A. Kiel, Sr., Balaton, Minn.

Filed Mar. 5, 1957, Ser. No. 644,071

3 Claims. (Cl. 280—32.5)

My present invention relates, broadly, to farm machinery and, more particularly, to a tractor drawn implement having riding seats and a trailer in tandem arrangement, said seats being mounted low with relatively little ground clearance, thus placing the rider on said seats in close proximity to the ground for the purpose of picking corn salvage behind a mechanical picker, potato picking on small fields, onion topping, rock picking, and certain seeding, weeding and crop harvesting operations.

The principal object of this invention is to provide an implement of the trailer type having riding seats in close proximity to the ground and cooperating foot and leg supports, and a trailer box in tandem arrangement behind said seats, whereby the rider in said seats may manually harvest, condition, seed or weed a crop or salvage crop without walking, stooping or carrying a receptacle.

Another object of this invention is to provide an implement which is drawn over a field that will quickly harvest the salvage or residue of a mechanical harvester by hand picking of the field by the riders on said implement.

Another object of this invention is to provide an implement that is relatively inexpensive to manufacture and operate and which is generally adaptable to tractive power available on most farms.

Another object of this invention is to provide an implement that is easily and readily, with a minimum amount of tools, adaptable to any of its intended uses.

A still further object of this invention is to provide an implement that affords every possible safety for the rider thereon, especial reference being made to protective means for the legs and feet that must necessarily be extended parallel to the ground by reason of the low mounted seats.

These and other objects of the invention will become apparent from the following specification and claims taken in conjunction with the appended drawings, which form a part of this application, and in which like characters indicate like parts throughout the several views.

To the above end, generally stated, the invention consists of the novel devices and combination of devices hereinafter described and defined in the claims.

Referring to the drawings:

Fig. 3 is a side elevational view of the invention without an integral trailer box;

Fig. 4 is a top plan view of the same;

Figure 1:
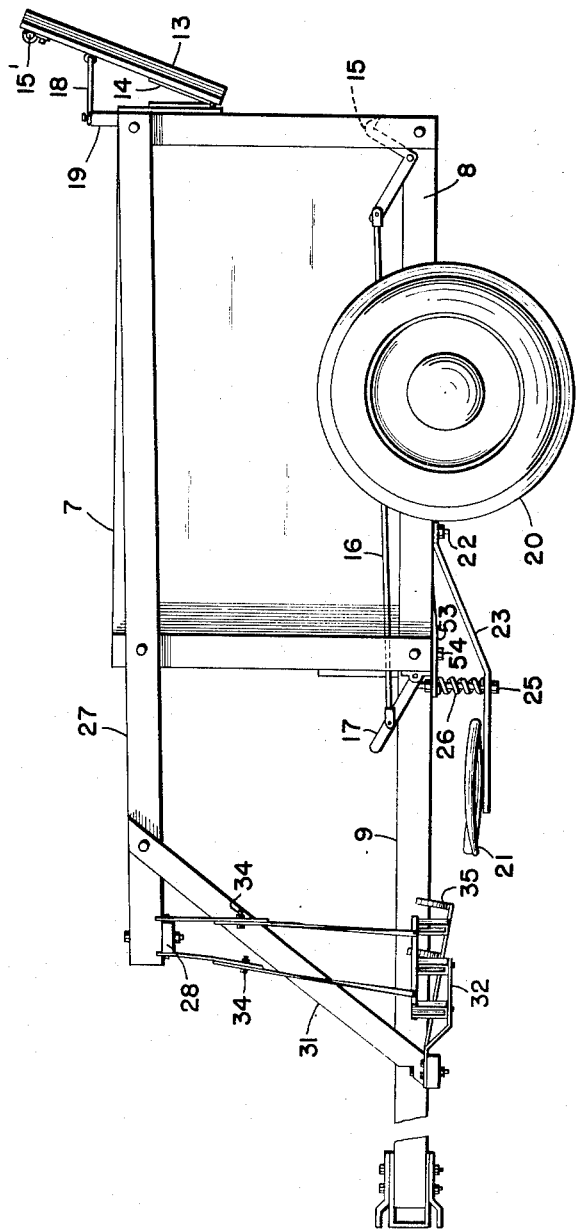
Fig. 1 is a side elevational view of the invention having an integral trailer box.

The numeral 7 indicates a trailer box mounted on a conventional bed frame 8 which is, in turn, mounted on a tongue 9 and axle 10 assembly by means of inner and outer pairs of nut-equipped U-bolts 11 and 12, respectively. Said U-bolts encircle the tongue 9 and the axle 10 and the threaded ends thereof extend through aligned bores in the bed of the trailer box 8, said members being drawn into close fitting engagement by tightening the said nuts on the U-bolts 11 and 12, see Figs. 3 and 4, wherein the U-bolts are shown connecting a modification of the trailer box to the running gear of the unit. A tail gate 13 is mounted, for upward and outward swinging movements, on the rear end portion of the trailer box by a plurality of hinges 14.

A bell-crank 15 is pivotally mounted on the trailer box 7 at one of its longitudinal sides at the rear end thereof for cooperating engagement of its outer end portion with latch means 15' on the tail gate 13. A relatively long link 16 pivotally connects the bell-crank and a hand lever 17 mounted on the trailer box frame 7 at the front end portion thereof. This bell-crank and operating components afford a simple and convenient means whereby the tail gate 13 may be latched closed or released for opening at a point convenient to the operator of the tractor or the trailer rider. A long hook or open-eyed bar 18 holds the tail gate open by engagement manually of the said hook or bar 18 and a post or eye 19 on the trailer body. A pair of ground wheels 20 are conventionally mounted on the outer end portions of the axle 10. Inasmuch as this implement is designed to move very slowly over a field, it has not been found to be necessary to spring mount the axle.

A pair of seats 21 are mounted on the bed frame 8 of the trailer box 7 by means of screw-threaded bolts 22 which extend through bores in the inner end portion of a spring steel seat beam 23 that is angularly bent downwardly from its anchor point on the trailer bed frame 8 to drop said seats into closer proximity with the ground. A plurality of transversely disposed bores 24 in the bed frame 8 afford lateral adjustment of the seats 21 and also provide for the installation of an extra pair of seats should the use of the device so dictate for a specific purpose. Nut-equipped spacer bolts 25 extend through a forward extension of the bed frame 8 and into a bore in the seat beam 23 rearwardly of the seats 21 and are provided with coiled springs 26 which, when placed under strain by the tightening of the nuts on the spacer bolts 25, acts to hold the seat assembly rigidly in position relative to the trailer. It is to be noted that the seats 21 are mounted to project substantially forwardly of the front end portion of the trailer box 7 to facilitate the filling of the trailer box 7 by riders on the seats 21.

Figure 2:
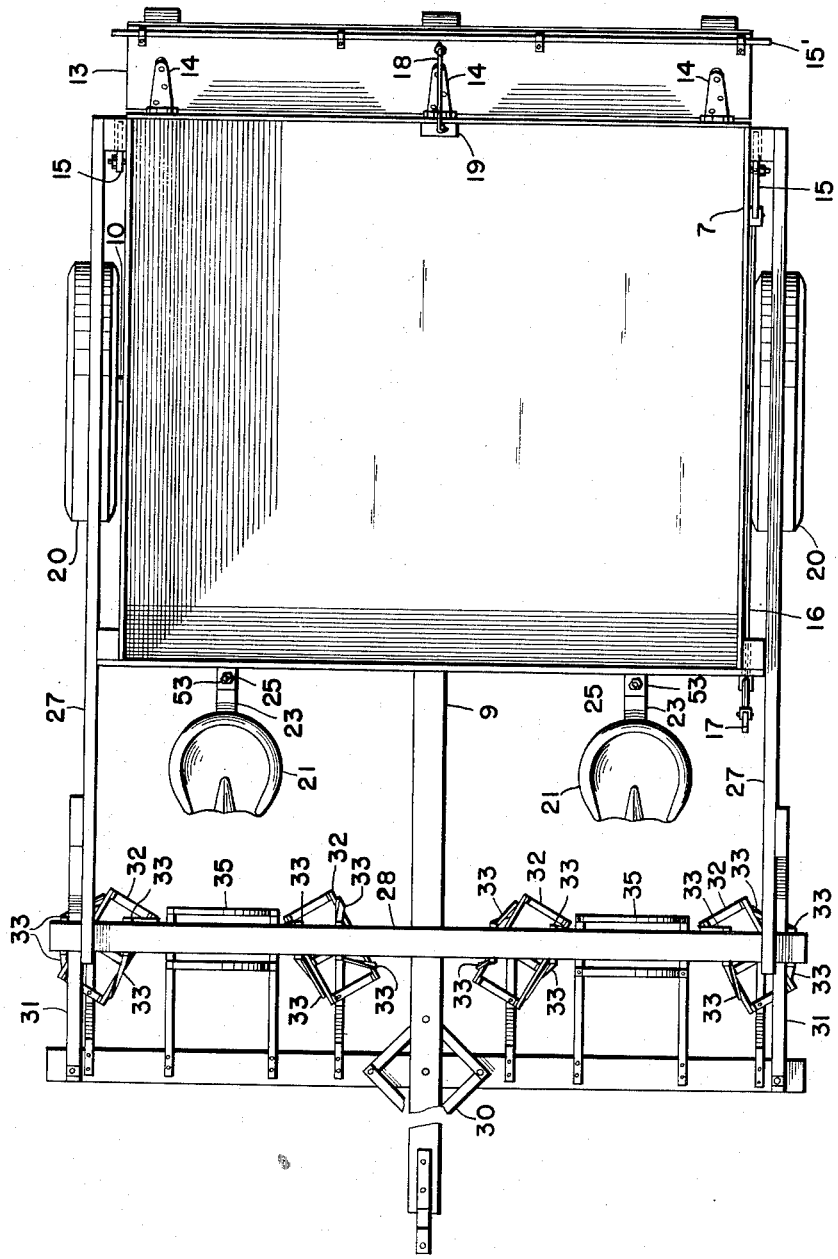
Fig. 2 is a top plan view of the invention showing those parts illustrated in Fig. 1.

A superstructure in the form of an overhead frame is comprised of a pair of side members 27 that are rigidly attached to the upper edge portion of each side of the trailer box 7, project forwardly thereof and very substantially overhang the seats 21. An upper cross-tie member 28 rigidly connects the outer end portions of the members 27 and a lower cross-tie member 29 underlies the tongue 9 and is rigidly connected thereto at its longitudinal center by any suitable means, i.e. strap bracing 30, as shown in Fig. 2, or a clamping means that would encircle the tongue and engage bores in the member 29. A pair of forwardly projected connecting bar members 31 are rigidly attached by suitable means at their upper end portion to the side members 27 and at their lower end portions to the cross-tie member 29. Obviously, the superstructure just recited affords a very rigid support frame, for purposes that will be presently described.

Obviously, in view of the low mounted position of the seats 21, provision must be made to support the legs and feet of the riders in said seats and for that purpose I provide pairs of cage-like stirrups 32 that are suspended from strap hangers 33 that are vertically and laterally adjustable for the comfort of the rider. As shown, this vertical adjustment is accomplished by the use of sectional hangers wherein the upper sections thereof are attached to the upper cross-tie bar 28 and the lower end portion thereof to the stirrup members 32. A screwthreaded nut-equipped bolt 34 extends through one of a plurality of bores in the overlying ends of each section of the hangers 33 as determined by the physical characteristics of the riders in the seats 21. A cornstalk guard 35 is designed for that purpose and is mounted between each pair of stirrups to press said stalks down as the implement is in forward motion until the seat bearing the rider passes over said stalks. Obviously, however, this stalk guard 35 may easily be replaced by a small platform to hold a basket when the unit is employed in harvesting operation, as one example of the use of such a platform.

Figure 5:
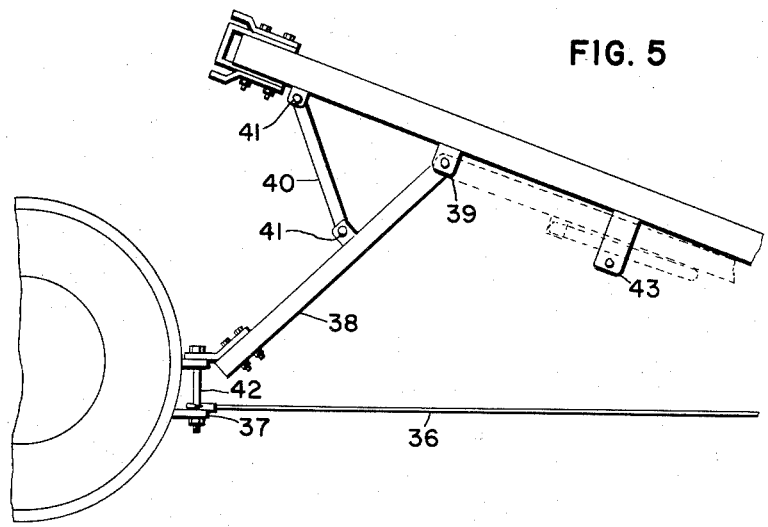
Fig. 5 is a fragmentary view of the tongue of the unit attached to the drawbar of a tractor and showing means for tilting the trailer and drawing the same during tilting movements.
Figure 6:
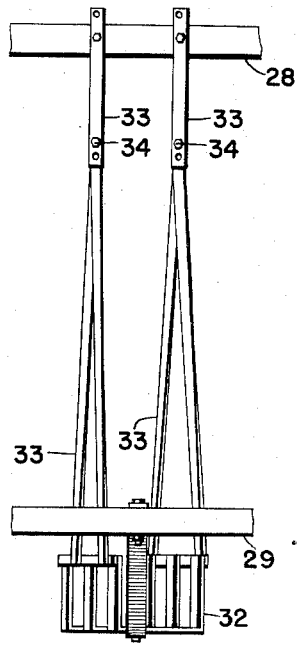
Fig. 6 is a view of one of the foot supporting stirrups on an enlarged scale.

It is well known that in emptying a trailer of the type described herein that often, merely by tilting the same, it cannot be relieved of its entire cargo. For instance, a load of field picked rock or ear corn that has not been shocked, will not necessarily run freely even at an angle and further, as the cargo piles up outside the tail gate 13 of a stationary trailer, to free the trailer of its entire cargo, it is, therefore, necessary to rock the same by motion imparted by the tractive unit, and, as shown, I have provided a simple expedient for accomplishing this rocking and motion. A cable 36 is first attached between the axle 10 and the drawbar 37 of the tractive unit to afford a positive connection between said tractive unit and the implement proper. A novel system of linkage pivotally connected to the underside of the tongue 9 comprises a short boom 38 pivotally connected to the tongue 9 at 39, see Fig. 5, and to the drawbar 37 by conventional means.

A connecting link 40 is pivotally attached to the boom 38 on its upper edge portion and to the lower edge portion of the tongue 9 by means of pivot pins 41, the tongue pin being removable. When the operator of the tractive unit desires to unload the trailer box 7 of cargo, that requires rocking and motion of the combined units, it is only necessary to pull the clevis pin 42 from the drawbar 37 and thus allow the trailer to tilt downwardly. The boom 38 is thence attached by the clevis pin 42 to the drawbar 37 and the link 40 connected to the tongue, thus maintaining the assembled relation of the tilt assembly just described. The heavy direct pull to impart forward motion is assumed by the cable 36 and thus no undue strain is placed upon the pivoted boom 38 or the tongue 9.

When this tilting assembly is not in use, it is folded back to lie in parallel arrangement beneath the tongue 9 and is thus held by a heavy clip 43 or the like.

Obviously, an implement of this type wherein riders are carried in close proximity to the ground, is adaptable to a number of different uses, as have been heretofore described. Generally speaking, Figs. 1 and 2 illustrate a form of the invention embodying a trailer box in tandem arrangement with the riding section of the implement. Figs. 3 and 4 illustrate a modified form of the implement wherein the trailer box is dispensed with in favor of a basket or box platform and supports these members especially in the use of the device as a seeding or harvesting adjunct.

Basically, this modification is the same as the form heretofore described and is identical therewith, reference being had to the tongue, running gear, stirrups, seat arrangement and the adjustment thereof especially for lateral movement. The major change is found in the elimination of the trailer box in favor of a platform, as will presently be described. In the interest of clarity, certain components that form a part of both versions of the invention will be identified hereafter by its original numeral accompanied by a prime (').

A skeleton frame is superimposed over the running gear and transversely centered over the axle 10' and comprises front and rear members 44 and 45, respectively, and a plurality of cross-tie members 46 that are rigidly attached to, and above the tongue member 9'. A pair of relatively wide longitudinally disposed frame members 47 overlie the axle 10' and are rigidly attached thereto by pairs of nut-equipped bolts 48 and afford a mounting station for the longitudinally adjustable seat member 21'. Front and rear elevated support members 49 and 50 are mounted on the front and rear frame members 44—45 and support a platform 51 having a bead or moulding 52 extending around its outer edge and end portions for the purpose of confining the materials being carried thereon. It is to be noted that the side members 27' are angled rearwardly and downwardly and are rigidly attached to the end portions of the platform supporting outer cross-tie members 46.

The seat members, as stated, are mounted on the frame by attaching the rear end portion of the seat beams 23' to the underside of the forward edge portion of the frame members 47 by means of nut-equipped bolts 22'. A secondary seat support beam 53 is also engaged by the bolts 22' at their rear end portions and rests on the upper forward edge of the frame members 47, extends under the lower edge portion of the forward platform support member 49 and projects forwardly thereof. A slot-like bore in said secondary beam 53 is in alignment with bores in the platform support member 49 and bolts 54 are provided to rigidly attach the secondary beam 53 to the member 49. It will be understood that materials used in the construction of the implement will dictate the type of bolt 54 that will be required. If the construction is of wood, the bolt 54 will obviously have to extend completely through the member 49, said bolt 54 being headed and nut-equipped. On the other hand, if the support member 49 is merely a steel frame formed of angle bar, then, of course, a relatively short nut-equipped bolt will extend only through the horizontal flange of the same. It will also be obvious that transversely aligned holes are formed in the forward edge of the member 47 to thus afford lateral adjustment of the seats 21'. As shown in Fig. 4, a pair of rather closely spaced bores appear at either side of the bore in which the secondary seat beam 53 is mounted. The purpose of these bores is to provide a minimum for a lateral movement of the seats 21' wherein the same will pivot on the bolts 22' making it necessary only to relocate the bolts 54. Thus appears the object of the longitudinally slotted bore 55 in the secondary beam 53 which compensates the radius of the swing of the pivoted seats 21' in making said minimum lateral adjustment. It will, of course, be understood that a plurality of seats may be added to the several mounting stations to afford an arrangement whereby four riders may be carried by the implement.

An adjustable spacer bolt 25' connects the main seat beam 23' and the secondary beam 53 to hold the assembly in alignment and provide for minor vertical adjustment of the seats 21'. A relatively heavy coiled spring 26' encircles substantially the full length of the bolts 25' to act as a spacer in combination with the said bolts between the seat beam members 23' and 53 and further acts to hold the entire assembly tight when placed under strain by the tightening of the nut on the bolts 25'.

In assembling the modified form of the invention, the stalk guard 35 will in most cases be supplanted by the small platform to hold baskets and boxes of material being seeded or harvested.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. An implement of the class described comprising in combination a frame, a tongue in a horizontal plane with said frame and having means for connecting the implement to tractive power, a running gear comprising parallel ground wheels mounted on an axle rigidly connected to said tongue and frame material carrying and supporting means mounted on said frame, a plurality of laterally adjustable riding seats mounted on said frame forwardly of said material carrying and supporting means and underlying the same in a horizontal plane, a superstructure overlying said frame and rigidly connected thereto, and pairs of vertically and laterally adjustable foot and leg supporting stirrups suspended from said superstructure forwardly of the said seats to support the leg and foot members of riders in said seats, and a crop guard mounted between said pair of stirrups.

2. The structure defined in claim 1 wherein the material carrying and supporting means is a platform mounted on said frame to support materials or receptacles.

3. The structure defined in claim 1, wherein the stirrups are in the form of an open cage to support the feet and leg members of riders in the seats, each stirrup being connected to the overlying superstructure by means of sectional straps, each section of said straps at their connecting end having a plurality of vertically spaced bores for a nut-equipped bolt to connect said sections, thus affording vertical adjustment of said stirrups.

References Cited in the file of this patent

UNITED STATES PATENTS

| | | |
|---|---|---|
| 238,332 | Fogg | Mar. 1, 1881 |
| 347,800 | Holmes | Aug. 24, 1886 |
| 1,524,655 | Jones | Feb. 3, 1925 |
| 1,745,562 | Taicher | Feb. 4, 1930 |
| 1,756,803 | Williams | Apr. 29, 1930 |
| 2,131,326 | Kaster | Sept. 27, 1938 |
| 2,511,940 | Platt et al. | June 20, 1950 |
| 2,514,249 | Madsen | July 4, 1950 |
| 2,523,832 | Kunkel | Sept. 26, 1950 |
| 2,551,744 | Huggler | May 8, 1951 |
| 2,583,358 | Cesan | Jan. 22, 1952 |
| 2,628,126 | Black | Feb. 10, 1953 |
| 2,679,283 | Mahone | May 25, 1954 |
| 2,734,751 | Burroughs | Feb. 14, 1956 |

FOREIGN PATENTS

| | | |
|---|---|---|
| 518,390 | Belgium | Mar. 31, 1953 |